United States Patent
Zhang et al.

(10) Patent No.: US 12,174,830 B2
(45) Date of Patent: Dec. 24, 2024

(54) STATISTICS UPDATE OF A DATABASE HAVING A PRIMARY SIDE AND A STANDBY SIDE

(71) Applicant: International Business Machines Corporation, Armonk, NY (US)

(72) Inventors: Jie Zhang, Beijing (CN); Fu Fei Xu, Beijing (CN); Peng Hui Jiang, Beijing (CN); Yi Lei Wang, Beijing (CN); Wen Jing Shi, Beijing (CN); Ling Qin, Beijing (CN); Guo Dong Wan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 186 days.

(21) Appl. No.: 17/653,724

(22) Filed: Mar. 7, 2022

(65) Prior Publication Data
US 2023/0281199 A1 Sep. 7, 2023

(51) Int. Cl.
*G06F 16/2453* (2019.01)
*G06F 11/34* (2006.01)
(Continued)

(52) U.S. Cl.
CPC .... *G06F 16/24542* (2019.01); *G06F 11/3409* (2013.01); *G06F 16/2462* (2019.01); *G06F 16/27* (2019.01)

(58) Field of Classification Search
CPC .......... G06F 16/24542; G06F 11/3409; G06F 16/2462; G06F 16/27; G06F 16/2453;
(Continued)

(56) References Cited

U.S. PATENT DOCUMENTS 7,831,592 B2   11/2010   Markl
2003/0088579 A1*   5/2003   Brown .................. G06F 16/284
(Continued)

FOREIGN PATENT DOCUMENTS

CN   111625553 A   9/2020
CN   106909674 B   4/2021

OTHER PUBLICATIONS

Mullins, C., "Database Statistics and Optimization", Database Trends and Applications, Feb. 15, 2009, 3 pgs., <https://www.dbta.com/Columns/DBA-Corner/Database-Statistics-and-Optimization-54605.aspx>.

*Primary Examiner* — Michael Pham
(74) *Attorney, Agent, or Firm* — Lily Neff, Esq; Kevin P. Radigan, Esq.; Heslin Rothenberg Farley & Mesiti P.C.

(57) ABSTRACT

Computer technology for use in a computer system including a database system including a database management sub-system, a primary database and a secondary database, with the secondary database being maintained at least approximately in synchronization with the primary database over time as changes are made to data of the primary database (for example, a database system that includes disaster recovery (DR) features). A statistics update is performed first on a standby database to determine whether query efficiency and/or query optimization really will be substantially improved by performance of the statistics update. If not, then statistics update on the primary database is postponed until a future time.

20 Claims, 6 Drawing Sheets

(51) Int. Cl.
*G06F 16/2458* (2019.01)
*G06F 16/27* (2019.01)

(58) Field of Classification Search
CPC .. G06F 2201/80; G06F 16/273; G06F 16/275; G06F 16/278
USPC ........................................................ 707/718
See application file for complete search history.

(56) References Cited

U.S. PATENT DOCUMENTS

| | | |
|---|---|---|
| 2006/0112093 A1 | 5/2006 | Lightstone |
| 2008/0256025 A1* | 10/2008 | Bestgen ................ G06F 16/903 707/E17.135 |
| 2009/0100004 A1* | 4/2009 | Andrei ................ G06F 16/2453 |
| 2009/0216709 A1 | 8/2009 | Cheng |
| 2013/0013586 A1* | 1/2013 | Muras ................ G06F 16/2462 707/718 |
| 2016/0292225 A1* | 10/2016 | Konik ............... G06F 16/24542 |

\* cited by examiner

STATISTICS UPDATE OF A DATABASE HAVING A PRIMARY SIDE AND A STANDBY SIDE

BACKGROUND

The present invention relates generally to the field of database operations, and more particularly to updating statistical information for database operations in a distributed database system that includes multiple copies of the same database, for example, a disaster tolerant database system that includes a primary copy of the database data and at least one secondary copy(ies) located remotely from the storage hardware hosting the primary copy of the database data. The primary copy of the data is herein referred to as a "primary database." The other copy(ies) are herein referred to as secondary database(s). As understood by those of skill in the art, the primary and secondary databases are kept as in sync as feasible so that if the primary copy is lost, then relatively little data will be lost when shifting operations to one of the secondary databases.

In conventional database systems, certain statistical information about the database contents and/or user transactions with the database data is collected and tracked. Herein, such information will be referred to as "database statistical metadata," or "DSMD." As will be appreciated by those of ordinary skill in the art, there are many types of DSMD. Some illustrative examples of DSDM data are: (i) table cardinality, which represents the total number of rows in the table of the database; (ii) number of pages in a database table; (iii) column cardinality, which represents the number of distinct values in a given column of a given database table; (iv) number of leaf pages in an index of the database; (v) number of index levels in an index of the database; and (vi) number of distinct key values in an index of the database. It is known that the values of the DSDM dynamically change over time as the tables and indices of the database change over time. The DSDM help the database answer queries and perform other operations in an efficient and organized manner.

Query efficiency for a given database system will now be discussed. The efficiency of a query is typically measured by the following metrics: (i) elapse time of the execution; (ii) total processor usage; (iii) ratio of the total number of rows read to the total number of rows returned; and (iv) the memory required for the execution (for example, how much memory is required for the locks allocation, how much memory is required for sorting operations). As for a mature database system, when a query is executed, regardless of whether in a production environment or in a test environment, the query efficiency value(s) are typically recorded in memory, and the database product provides a utility to dump out these metrics from memory into formatted form.

The Wikipedia entry for "query optimization" (as of 16 Jan. 2022) states, in part, as follows: "Query optimization is a feature of many relational database management systems and other databases such as graph databases. The query optimizer attempts to determine the most efficient way to execute a given query by considering the possible query plans. Generally, the query optimizer cannot be accessed directly by users: once queries are submitted to the database server, and parsed by the parser, they are then passed to the query optimizer where optimization occurs. However, some database engines allow guiding the query optimizer with hints. A query is a request for information from a database. It can be as simple as 'find the address of a person with Social Security number 123-45-6789,' or more complex . . . The result of a query is generated by processing the rows in a database in a way that yields the requested information. Since database structures are complex, in most cases, and especially for not-very-simple queries, the needed data for a query can be collected from a database by accessing it in different ways, through different data-structures, and in different orders. Each different way typically requires different processing time. Processing times of the same query may have large variance, from a fraction of a second to hours, depending on the chosen method. The purpose of query optimization, which is an automated process, is to find the way to process a given query in minimum time. The large possible variance in time justifies performing query optimization, though finding the exact optimal query plan, among all possibilities, is typically very complex, time-consuming by itself, may be too costly, and often practically impossible. Thus, query optimization typically tries to approximate the optimum by comparing several common-sense alternatives to provide in a reasonable time a 'good enough' plan which typically does not deviate much from the best possible result." (footnotes omitted)

SUMMARY

According to an aspect of the present invention, there is a method, computer program product and/or system for use with a computer system including a database system including a database management sub-system, a primary database and a secondary database, with the secondary database being maintained at least approximately in synchronization with the primary database over time as changes are made to data of the primary database, that performs the following operations (not necessarily in the following order): (i) performing a statistics update operation on the secondary database; (ii) testing query operations on the secondary database to determine that query efficiency is improved by the statistics update; (iii) testing query operations on the secondary database to determine that query optimization is improved by the statistics update; and (iv) in response to the determination that query efficiency is improved, and further in response to the determination that query optimization is improved, performing the statistics update operation on the primary database.

According to an aspect of the present invention, there is a method, computer program product and/or system for use with a computer system including a database system including a database management sub-system, a primary database and a secondary database, with the secondary database being maintained at least approximately in synchronization with the primary database over time as changes are made to data of the primary database, that performs the following operations (not necessarily in the following order): (i) performing a statistics update operation on the secondary database; (ii) testing query operations on the secondary database to determine that query efficiency is improved by the statistics update; and (iii) in response to the determination that query efficiency is improved, performing the statistics update operation on the primary database.

According to an aspect of the present invention, there is a method, computer program product and/or system for use with a computer system including a database system including a database management sub-system, a primary database and a secondary database, with the secondary database being maintained at least approximately in synchronization with the primary database over time as changes are made to data of the primary database, that performs the following operations (not necessarily in the following order): (i) performing a statistics update operation on the secondary database; (ii) testing query operations on the secondary database to determine that query efficiency is not substantially improved by the statistics update; and (iii) in response to the determination that query efficiency is not improved, foregoing performance of a statistics update operation on the primary database until a future statistics update check on the primary database has been triggered.

DETAILED DESCRIPTION

Figure 1:
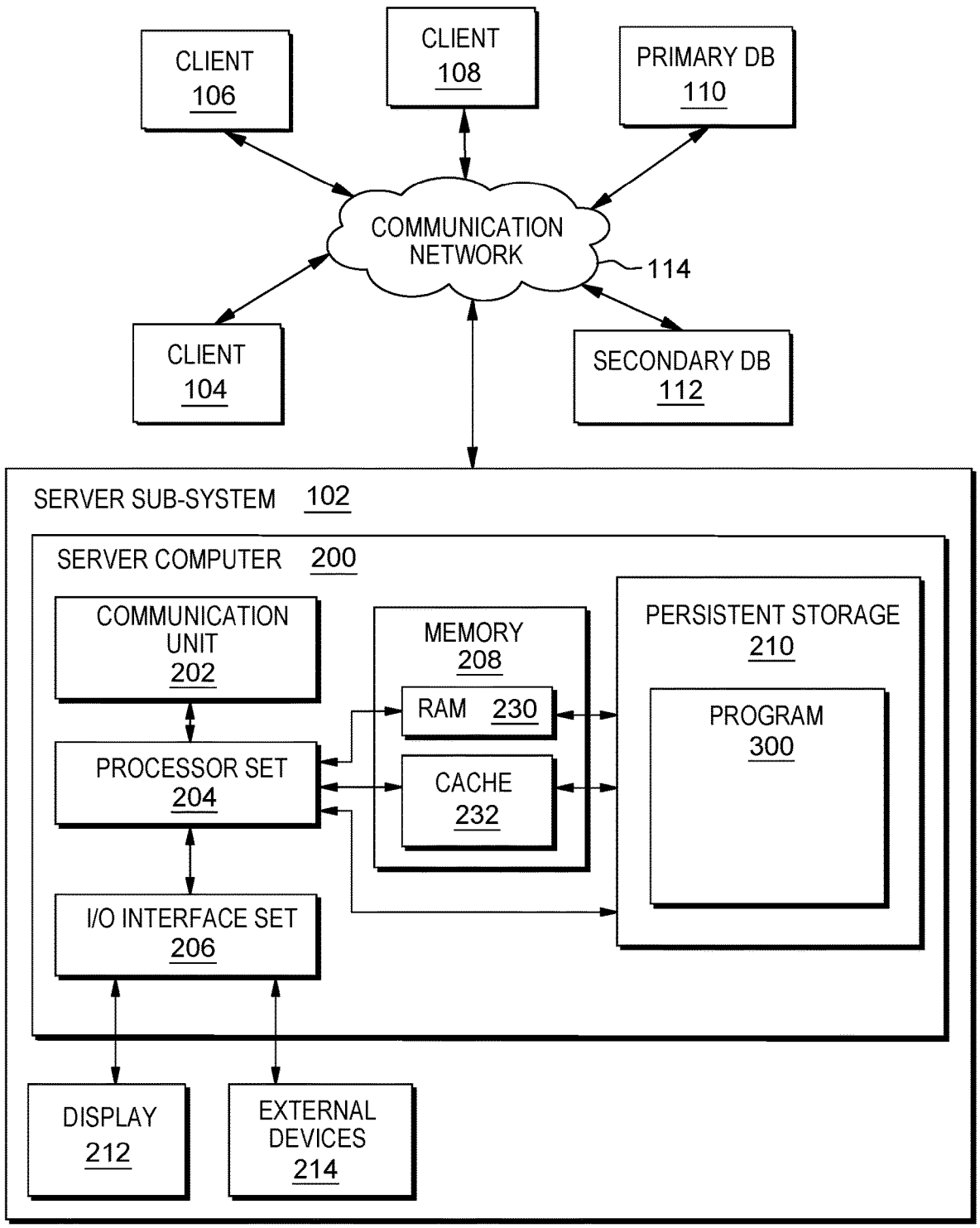
FIG. 1 is a block diagram of a first embodiment of a system according to the present invention.

Some embodiments of the present invention are directed to a computer system including a database system including a database management sub-system, a primary database and a secondary database, with the secondary database being maintained at least approximately in synchronization with the primary database over time as changes are made to data of the primary database (for example, a database system that includes disaster recovery (DR) features). A statistics update is performed first on a standby database to determine whether query efficiency and/or query optimization really will be substantially improved by performance of the statistics update. If not, then statistics update on the primary database is postponed until a future time. This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108; primary database 110; secondary database (may also be referred to as a "standby database") 112 and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
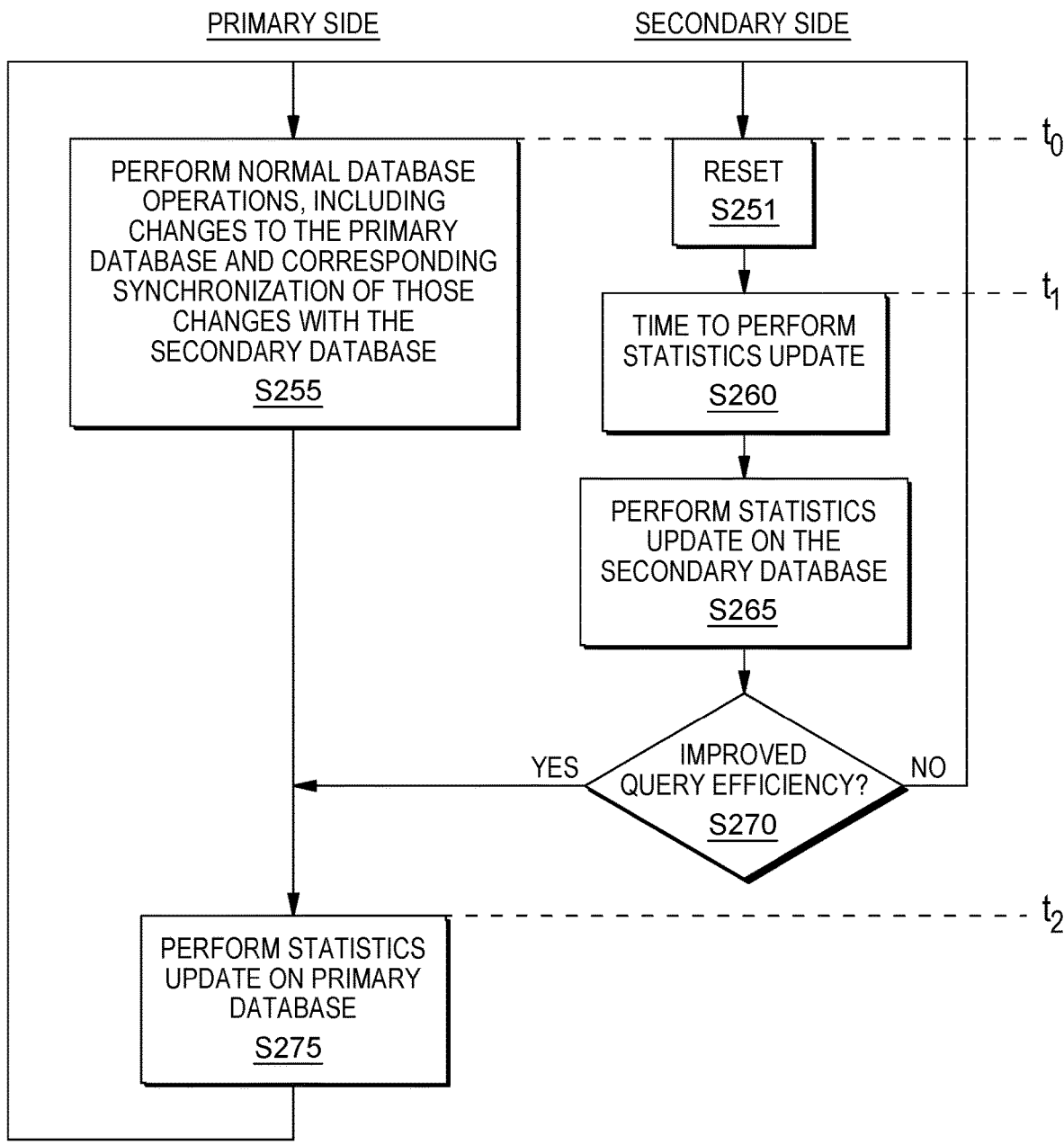
FIG. 2 is a flowchart showing a first embodiment method performed, at least in part, by the first embodiment system.
Figure 3:
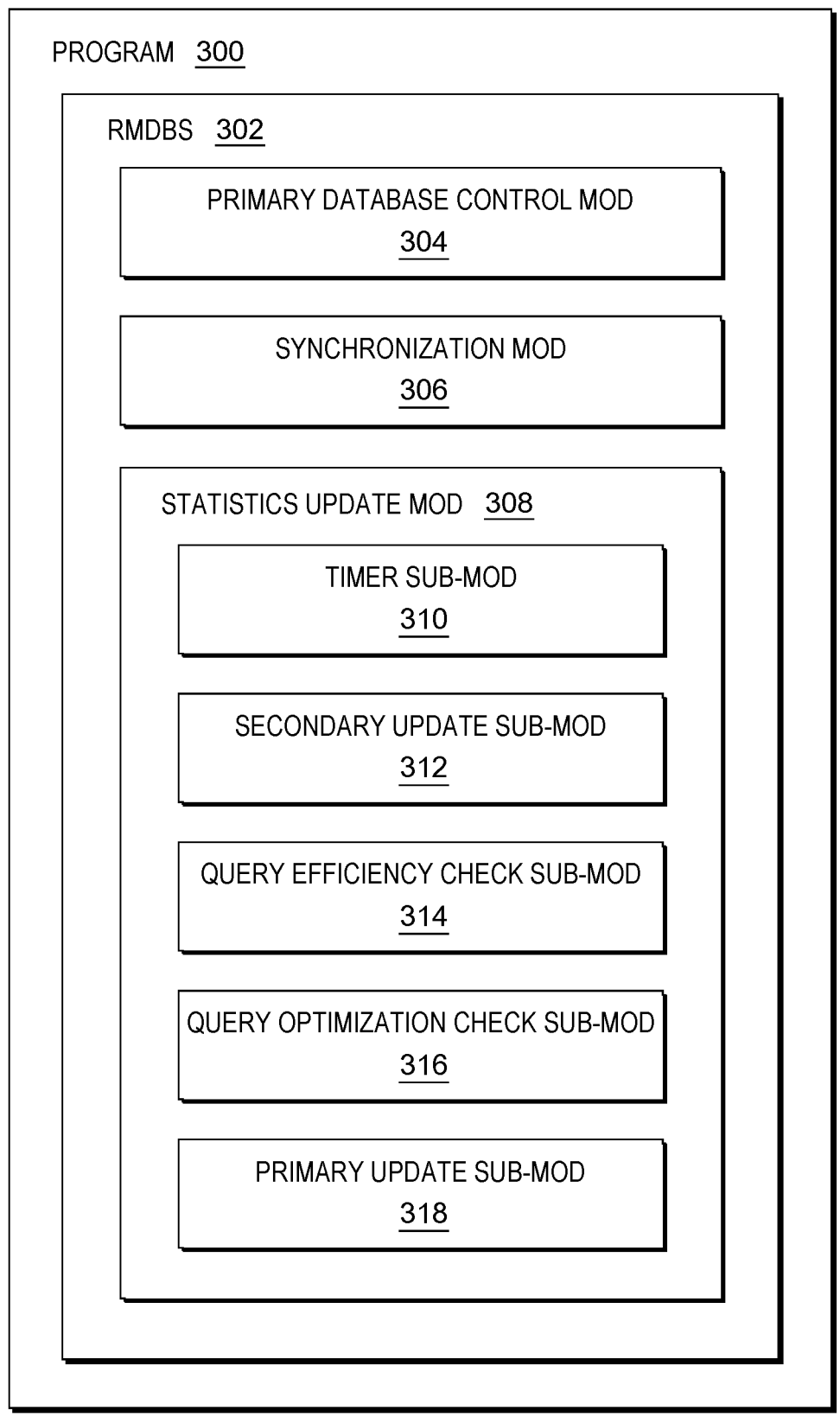
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Before launching into an operation by operation description of flowchart 250, there will now be some discussion of networked computers system 100 (may also be herein referred to as database system 110). As shown in FIG. 1, database system 100 includes: (i) multiple users who access the database in various ways (represented by client sub-systems 104, 106 and 108); (ii) a database management sub-system, which is included in program 300 as RDBMS (relational database management systems) 302; (iii) primary database 110; and (iv) secondary database 112. As will be understood by those of skill in the art, the secondary database is maintained at least approximately in synchronization with the primary database over time as changes are made to data of the primary database. In some embodiments, the database management system is and/or includes a disaster recovery system so that a disaster involving the primary database will not lead to substantial data loss due to maintenance of data in the secondary database. In some embodiments, there is more than one secondary database. In some embodiments, the database management system may be included in the same computer hardware that hosts the primary and/or secondary database(s). In some embodiments, the identity of the primary database may change over time (that is, a secondary database may become the new primary).

Processing begins at operation S255, where primary database control module ("mod") 304 and synchronization mod 306 control the normal operations and use of database system 100. These operations include query access to the primary database and/or secondary database; revisions and updates to the data and/or data structures of the primary database; and synchronization of the secondary database with the primary database.

While operation S255 is ongoing and at time to, at operation S251, a statistics update trigger clock included in timer sub-mod 310 of statistics update mod 308 is reset. In this embodiment, a timer is used to determine when a statistics update is triggered (or at least considered). Alternatively, other techniques may be used for triggering potential statistics updates, such as triggering based on amount of data changed since the last update or manually scheduled potential statistics update triggering. In this example, the timer will trigger consideration of a new statistics update at time $t_1$.

At time t1, operation S260 is performed, where timer sub-mod 310 triggers operation S265.

Processing proceeds to operation S265, where secondary update sub-mod 312 performs a statistics update operation on the statistics of secondary database 112. In this example, the statistics update operation of the secondary database updates all of the following types of database statistical metadata (DSMD): (i) table cardinality of the given database; (ii) number of pages in a database table of the given database; (iii) column cardinality of at least one table included in the given database; (iv) number of leaf pages in an index of the given database; (v) number of index levels in an index of the given database; and (vi) number of distinct key values in an index of the given database.

Figure 4:
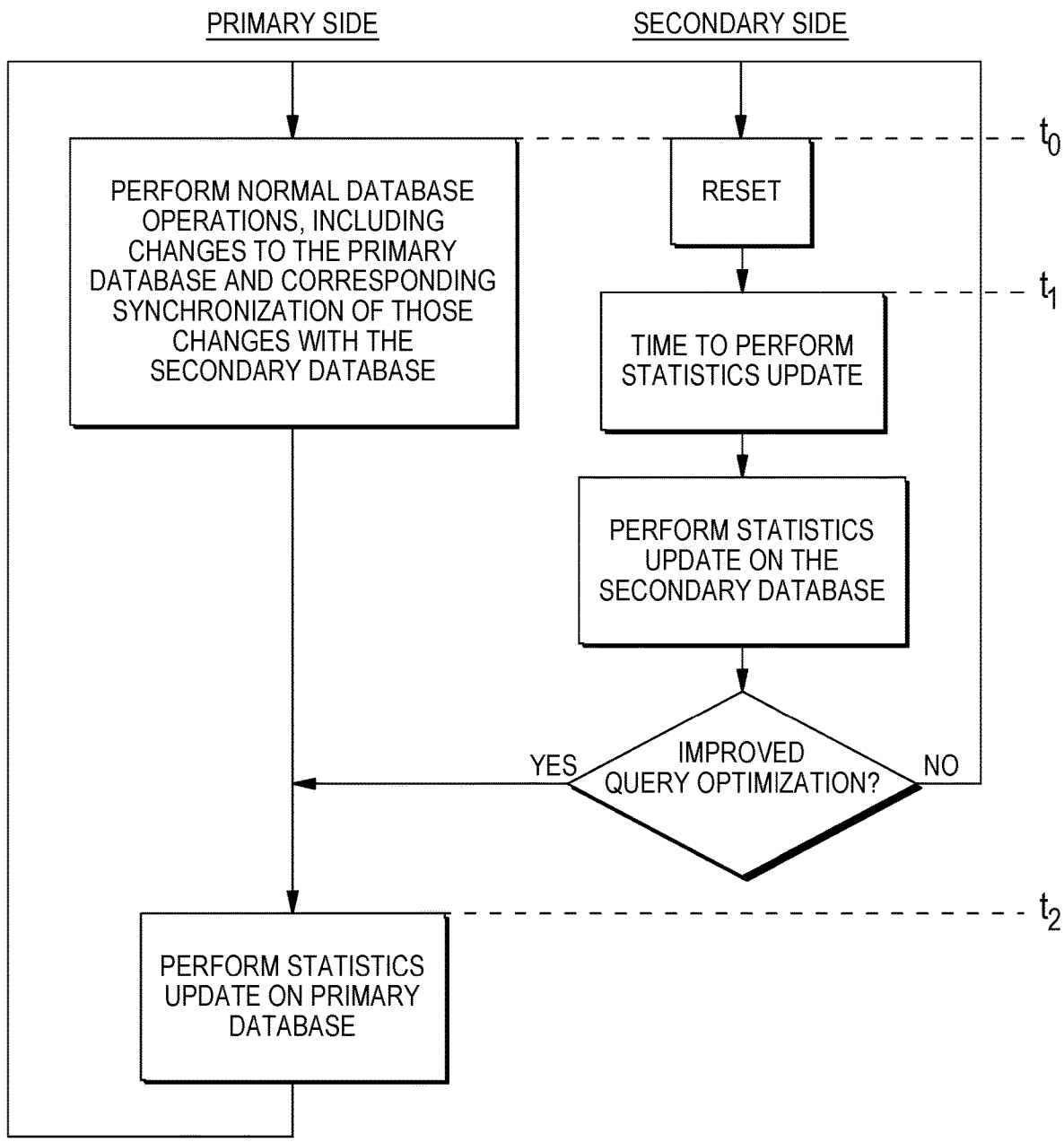
FIG. 4 is a flowchart showing a second embodiment of a method according to the present invention.

Processing proceeds to operation S270, where query efficiency check sub-mod 314 tests query operations on the secondary database to determine whether query efficiency is improved in the secondary database by the statistics update of operation S265. In this embodiment, the testing of query operations on the secondary database to determine whether query efficiency is improved includes determining the following metrics: (i) elapse time of the execution; (ii) total processor usage; (iii) ratio of the total number of rows read to the total number of rows returned; and/or (iv) the memory required for the execution. As shown by flowchart 400 of FIG. 4, a similar test may be performed by query optimization check sub-mod 316 with respect to query optimization. In this embodiment, the improvement to efficiency has to surpass at least one of several threshold values for minimum improvement respectively set for the above identified efficiency metrics. Alternatively, the thresholds may be set to zero (any improvement in any metric means that efficiency has been considered to be improved) or may be set negative (meaning that avoidance of substantial degradation will be considered as an efficiency improvement).

If query efficiency is determined to be improved at operation S270, then processing proceeds, at $t_2$, to operation S275, where primary update sub-mod 318 performs a statistics update on primary database 110. The processing proceeds back to operations S251 and S255. On the other hand, if query efficiency is not determined to be improved at operation S270, then processing proceeds back to operations S251 and ongoing operation S225 without performing a statistics update on the primary database. The advantages of foregoing an update on the primary database will be further discussed in the next sub-section of this Detailed Description section.

III. Further Comments and/or Embodiments

Some embodiments of the present invention recognize one, or more, of the following facts, potential problems and/or potential areas for improvement with respect to the current state of the art: (i) statistics information is the basis for query optimizer software to make truly optimal decisions; (ii) most of the RDBMSs support automatic statistical information collection, but these collection methods have some problems; (iii) statistics updates that are based upon timed execution cannot detect execution statements that are characterized by deteriorating performance in time; (iv) in some databases, statistics updates are triggered by some predetermined amount of data change in the database and this can lead to statistics updates being performed at peak hours; (v) performing statistics updates at peak hours can cause conflicts (for example, such as lock conflicts or lock waiting) between the regular operations of the RDBMS and the execution of update statistics, meaning that the effectiveness of the statistics update execution is not high; (vi) most statistical information updates do not result in actual execution efficiency improvements; (vii) although a relatively infrequently encountered situation, the statistics updating can decrease execution efficiency; (viii) due to the above points, database operators sometimes turn off the automatic statistics update function in favor of manually performing statistics updates; and/or (ix) even if customers performs the statistics update manually, it still cannot fundamentally avoid the above-mentioned problems.

Some embodiments of the present invention may include one, or more, of the following operations, features, characteristics and/or advantages: (i) allows adaptive evaluation of the statistics update strategy, not only based on the amount of data changes, but also by evaluating the frequency of reads, and the difference between the evaluated value and the actual executed value to adjust the priority of statistical updates; (ii) using a standby machine to actually perform the statistics update: (a) avoids performance impact on the primary machine, (b) evaluates whether the statistical update really brings value, and/or (c) avoids a potential bad query plan to affect product system running; and/or (iii) using the evaluation results generated on the standby machine to optimize the strategy of the primary machine to perform the statistical update.

Some embodiments of the present invention may include one, or more, of the following operations, features, characteristics and/or advantages: (i) includes adopting an approach to evaluate the efficiency of statistics updates; and/or (ii) includes optimizing the strategy of statistics information collection using the most common HA (high availability) environment for a relational database by: (a) collecting performance metrics of a user table from the primary machine to generate a candidate list of statistics updates to be executed (based on the amount of data change, frequency of data read/write, and estimating the deviation of top SQLs), (b) using the standby machine to verify the execution of statistical updates, (c) generate provisional statistical information and verify the efficiency of the execution of statistical information updates using the top SQL associated with the candidate tables, (d) based on the evaluation results, feedback is given to the primary box on whether the statistics need to be actually executed, (e) if there is an improvement in the case of immediate implementation, a neutral result will occur according to the performance indicators of the primary to decide whether to implement, and a negative results in the case, will avoid the implementation and will notify the DBA (database administrator) through an alert message, (f) using the performance metrics of the primary box, the evaluation results are used as input options for machine learning, and/or (g) the timing of executing statistics information is optimized by iterative algorithms.

Some embodiments of the present invention may include one, or more, of the following operations, features, characteristics and/or advantages: (i) dynamically collects the primary operation data, including: (a) the amount of data change, (b) the read/write frequency, (c) the difference between the evaluation and execution of the top SQL, and/or (d) uses these metrics to generate a candidate list to execute the statistics update; (ii) executes the statistics updates on the standby side to avoid affecting the concurrent services of the primary; (iii) verify the execution efficiency of top the SQL with the new statistical information generated on the standby side; (iv) generates the evaluation result; (v) based on the evaluation results, provides feedback on whether: (a) the primary needs to execute statistics updates, (b) execute the needed statistics update, (c) reduce the collection of statistical information without improvement, and/or (d) avoid the execution of statistics updates that may bring negative effects; and/or (vi) based on the information collected from the primary (IUD change, SQL execution density, etc.) and the results of the evaluation: (a) the next execution of statistics can be predicted by machine learning, and/or (b) a schedule for executing statistics can be generated for each user table.

Some embodiments of the present invention may include one, or more, of the following operations, features, characteristics and/or advantages: (i) provides a method of updating statistics adaptively and intelligently in a database not only based on data changes and data reads, but also on query performance and system performance; (ii) the update of statistics only runs when it's real necessary, because statistics requirement is evaluated accurately with automatic optimization ability; (iii) the update statistics is automatically run at the right time, when: (a) query performance is already bad, (b) query performance is probably going to be bad soon, and/or (c) at a time when it will have little influence on other applications; (iv) all the metrics used are existing metrics; and/or (v) can be implemented in any RDBMS by helping to improve the efficiency and effectiveness of the automatic statistics collection feature.

Some embodiments of the present invention may include one, or more, of the following operations, features, characteristics and/or advantages: (i) can execute the statistics update on the standby machine; (ii) can evaluate the execution efficiency of the top SQL; (iii) can judge whether there is a need to execute the statistics update on the primary machine based on the evaluation result; (iv) can export the next execution of statistics which can be predicted by machine learning; (v) a schedule for executing statistics can be generated for each user table; (vi) can generate a list of candidate statistical updates based on the trend of data change, the difference of the actual execution pre-evaluation value, and by evaluating in the standby machine; and/or (vii) only statistical updates that bring performance improvement to the system will be executed in the primary host.

Statistics updates can improve the accuracy of the optimizer in most cases, but in rare conditions, there is a risk of degradation of query efficiency after the statistics update has been performed. When this situation occurs, the user can only specify the query plan through the optimizer indicator or re-execute the statistics update. Using the existing database Disaster Recovery DR system, there can be obtained the list of data tables that need to be statistically updated on the primary side, and based on the mechanism of log synchronization, there can also be obtained the same list on the standby side (that is, the secondary database side). By performing the statistical update on the standby and evaluating the execution plan of the major SQL (structured query language) logic after the statistical update, information relating to the following three scenarios can be generated and fed back to the primary: (i) the execution efficiency does not change after the statistics update, so the primary is informed that it is not necessary to execute the statistics update, thereby reducing the impact on the primary operation; (ii) there is a significant improvement in efficiency after the statistics update, so the host is instructed to continue executing the statistics update; and (iii) if the efficiency drops after the statistics update, suspend the host from executing the statistical update and output the log.

Using a pre-existing database Disaster Recovery system, the list of data tables that need to be statistically updated on the primary side can be obtained. Based on the mechanism of log synchronization, the same list can also be obtained on the standby side. By performing the statistical update on the standby and evaluating the execution plan of the major SQL logic after the statistical update, information relating to the following three scenarios listed in the previous paragraph can be generated and fed back to the primary.

Query optimizers typically use table statistics to determine the best query plan. Statistics can be collected manually or automatically, but most users still choose to use the manual method to perform update statistics. Both time based and volume based statistics updates have their own potential problems. Time based statistics updates are performed in the manner of a cron job (a cron job is a job scheduler on Unix-like operating systems). Volume based statistics updates may cause resource conflicts, especially during peak hours. Another situation is uncommon but has the potential to cause severe problems for database users, specifically, situations where the optimizer chooses a less efficient path after performing the statistics update than it would have chosen before the statistics update. For example, consider the following example of database operations: (i) in last 360 days, totally 1275 tickets (out of 30 k in total) opened asking help on automatic statistics collection feature; (ii) 60+ tickets complaining auto runstats caused resource contention; (iii) 47 tickets suggested the users to turn off auto runstats; and (iv) 48 tickets asking how to turn off auto stats for parts of table.

Some embodiments of the present invention may include one, or more, of the following operations, features, characteristics and/or advantages: (i) through an adaptive algorithm, candidate tables to be updated are chosen on the primary side: (a) based on the amount of data variation, (b) the density of SQL running on a particular data table, and/or (c) the difference between the optimizer's predicted cost and the actual execution; (ii) real statistics updates are executed on the standby side, and the effectiveness of these candidates is evaluated using the actual execution of these SQL processes; and/or (iii) the evaluation results are used to optimize the candidate selection method.

Figure 5:
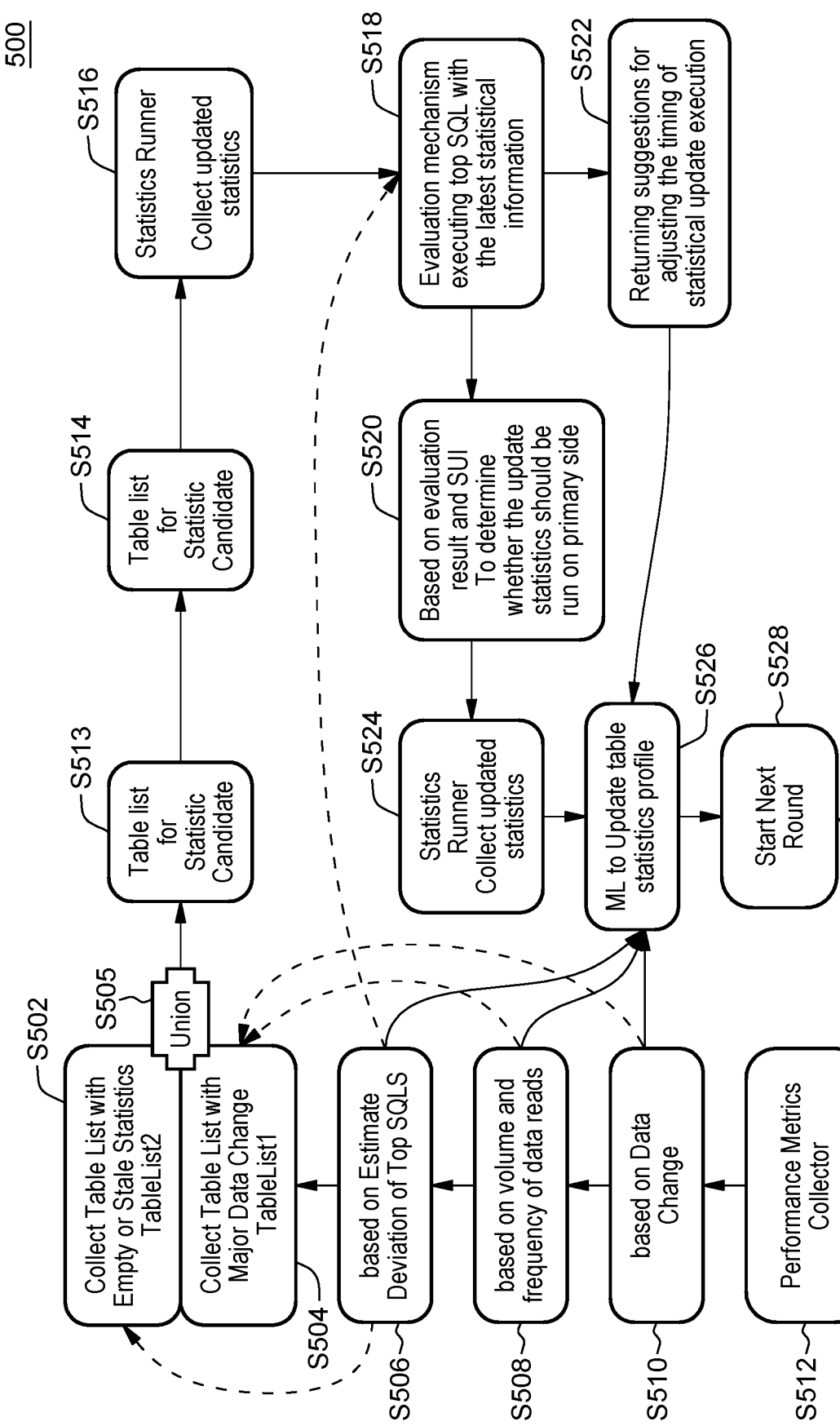
FIG. 5 is a flowchart showing a third embodiment of a method according to the present invention.

As shown in flowchart 500 of FIG. 5, a method for selectively performing statistics updates on a database computer system including a primary and secondary database includes the following operations (with process flow among and between the operations being shown by the arrows of flowchart 500): S502; S504, S505; S506; S508; S510; S512; S513; S514; S516; S518; S520; S522; S524; S526; and S528.

Operations S508 and S506 will now be discussed. Calculation of statistics update candidate list is based IUD (insert/update/delete) ratio(s) and performed by first considering Configurable Parameters including CP1 Credit Points for Data Change; and then performing steps (a) to (d) as follows:
(a) For each table Ti in TableList {T1, T2, . . . Tn}, collect IUD Ratio as shown by the following Equation (1):

$$\text{IUD\_Ratio(Ti)} = \frac{\text{IUD\_Counter(Ti)}}{\text{Number\_of\_Rows(Ti)}} \quad (1)$$

If IUD_Ratio(Ti)<X % then IUD_Ratio(Ti)=0.
(b) Sum of IUD ratios for TableList is given by the following Equation (2):

$$\text{SUM\_IUD\_Ratio} = \Sigma_{i=1}^{n}(\text{IUD\_Ratio}(Ti)) \quad (2)$$

(c) For each table Ti in TableList {T1, T2, . . . Tn}, calculate SUI Statistics Urgency Index according to the following Equation (3)

$$SUI(Ti) = \frac{CP1}{\text{SUM\_IUD\_Ratio}} * \text{IUD\_Ratio(Ti)} \quad (3)$$

(d) The statistics candidate list is then obtained by Equation (4) as follows:

$$\text{StatisticsCandidateList} = \{(T1,SUI(T1)),(T2,SUI(T2)), \ldots (Tn,SUI))\} \quad (4)$$

Operations S508 and S506 will now be discussed. Statistics update list is calculated based on IUD Ratio by determining configurable parameters (CP2—Credit Points for Data Reads and then performing steps (a) to (e) as follows:
(a) For each table Ti in StatisticsCandidateList, collect solutions to the following Equations (5), (6), (7) and (8):

$$\text{TotalPages}(Ti) = \text{Total number of pages of } Ti \quad (5)$$

$$\text{PageReads}(Ti) = \text{Number of page reads of } Ti \quad (6)$$

$$\text{PageReadsRatio}(Ti) = \text{PageReads}(Ti)/\text{TotalPages}(Ti) \quad (7)$$

$$\text{NumberAccess}(Ti) = \text{Number of times this table } Ti \text{ was accessed} \quad (8)$$

(b) Solve the following Equation (9):

$$\text{TotalPageReadsRatio} = \Sigma_{i=1}^{n}(\text{PageReadsRatio}(Ti)) \quad (9)$$

(c) Solve the following Equation (10):

$$\text{TotalAccess} = \rho_{i=1}^{n}(\text{numberAccess}(Ti)) \quad (10)$$

(d) Recalculate Statistics Urgency Index for table Ti using Equation (11) as follows:

$$SUI(Ti) = (0.5*CP2)/\text{TotalPageReadsRatio} * \text{PageReadsRatio}(Ti) + X$$

Where $X = (CP2*0.5)/\text{Toaotal Accesses}*\text{numberAccess}(Ti)$ (11)

(e) Get updated StatisticsCandidateList using Equation (12):

$$\text{StatisticsCandidateList} = \{(T1, SUI(T1), (T2, SUI(T2)), \ldots (Tn, SUI(Tn))\}. \quad (12)$$

Operations S510 and S508 will now be discussed. According to some embodiments of the present invention, a large difference between estimation and actual results indicates that the statistics are probably outdated. An example of this is displayed in the Table 1 below:

TABLE 1

| Access Plan | First Executions | Latest Executions |
| --- | --- | --- |
| Estimated # Returned Rows R1 | Avg Actual # Return Rows R2 | Avg Actual # Return Rows R3 |
| Estimated Cost C1 | Actual CPU Time C2 | Actual CPU Time C3 |

Statistics Update candidate list is calculated based on Estimate Deviation of top SQL using Configurable Parameters: M (which considers Top M SQLs; and CP3 (that is, Credit Points for Top SQLs): The following steps (a) to (f) are preformed:

(a) Collect Top M SQLs order by CPU usage using Equation (13) as follows:

$$\text{CurTopSQLList} = \{SQL1, SQL2, \ldots SQLy\} \quad (13)$$

(b) Collect R1, R2, R3, C1, C2, C3 for each SQLi in CurTopSQLList, which is given by the following expression: SQLi(R1, R2, R3, C1, C2, C3).

(c) Calculate Estimate Deviation for SQLi using Equation (14) as follows:

$$EstDeviation(SQLi) = \frac{\left(\frac{SQLi(R2)}{SQLi(R1)} - \frac{SQLi(R3)}{SQLi(R1)}\right)^2 + \left(\frac{SQLi(C2)}{SQLi(C1)} - \frac{SQLi(C3)}{SQLi(C1)}\right)^2}{4} \quad (14)$$

(d) For each table Tj in TableList, calculate its Accumulative Estimate Deviation. If Ti is referenced in SQLi then the following Equation (15) is used:

$$\text{AccumEstDeviation}(Tj) += EstDeviation(SQLi) \quad (15)$$

(e) For each table Tk in TableList, Statistics Urgency Index is recalculated using the following Equation (16):

$$SUI(Tk) += \frac{CP3}{\sum_{h=1}^{n}(\text{AccumEstDeviation}(Th))} * \text{AccumEstDeviation}(Tk) \quad (16)$$

(f) Get updated StatisticsCandidateList using the following Equation (17):

$$\text{StatisticsCandidateList} = \{(T1, SUI(T1), (T2, SUI(T2)), \ldots (Tn, SUI(Tn))\}. \quad (17)$$

Operations S502, S504 and S505 will now be discussed: (a) at operation S504, a table list with major data change is collected using Configurable Parameters X (that is, the Data Change Ratio Threshold; (b) at operation S502, a table list with empty or stale statistics is collected using Configurable Parameters Y (that is, statistics that were collected Y days before the statistics were determined to be stale); and (c) at operation S505, a union of the table lists previously obtained at S502 and S504 is performed (that is, TableList=TableList1 and TableList2={T1, T2, . . . Tn}). Operation S504 includes the following sub-steps (a) and (b):

(a) Collect IUD Ratio for all tables using Equation (18):

$$\text{IUD\_Ratio}(Ti) = \frac{\text{IUD\_Counter}(Ti)}{\text{Number\_of\_Rows}(Ti)} \quad (18)$$

(b) Collect all tables having IUD_Ratio>=X %: TableList1={T1', T2', . . . Ta'}. Operation S502 includes collection of all tables with Last statistics date is NULL or Last statistics date current data>=Y days as given by Equation (19):

$$\text{TableList2} = \{T1'', T2'', \ldots Tb''\}. \quad (19)$$

Operations S518 and S520 will now be discussed. Execution efficiency of top SQL is evaluated after the statistics update has been performed on the Standby side, including Configurable Parameters Z (that is, difference between primary and standby execution time>Z % indicates potential bad performance) and CP4 (that is, Credit Points for evaluation of Top SQLs). The following steps (a) to (c) are performed:

(a) The top M SQL and references any table in TableList are collected to get average an execution time from primary, using the following computer code: ReferencedTopSQLList (b) Compare which SQL(s) in ReferencedTopSQLList probably meet bad performance issue where For each SQL SQLi in ReferencedTopSQLList, Actual execution time (with new stats) currentExecutionTime (SQLi), as given by the following computer code:

$$\text{If } \frac{ActualExecutionTime(SQLi) - currentExecutionTime(SQLi)}{currentExecutionTime(SQLi)} > Z\%,$$

PredicatedBadSQLList.add(SQL)
Get: PredicatedBadSQLList
(c) Get updated StatisticsCandidateList: StatisticsCandidateList={(T1, SUI(T1), (T2, SUI(T2)), . . . (Tn, SUI(Tn))}.

Figure 6:
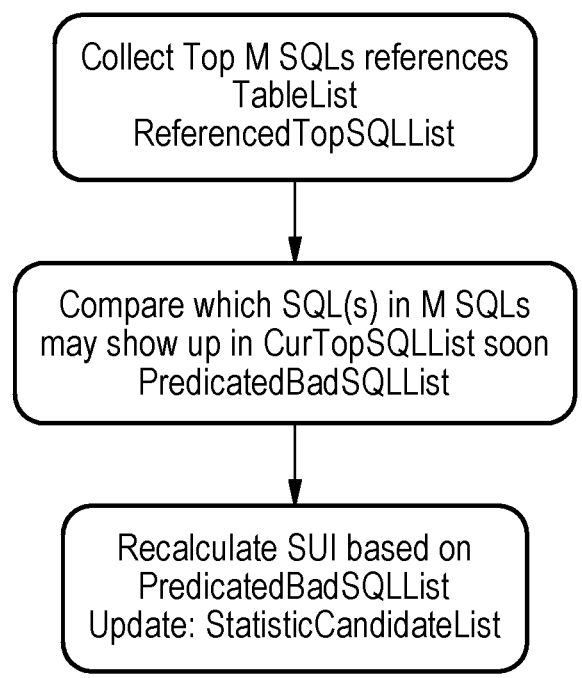
FIG. 6 is a flowchart showing a portion of the third embodiment method.

Steps (a) to (c) set forth in the previous paragraph are shown in flowchart 600 of FIG. 6. Operation S520 will be discussed in detail in the following two (2) paragraphs.

Attributes involved in operation S520 include: (a) SUI Range—Divide (0, max(SUI)) into R (that is, 24) ranges: {RangeA1, RangeA2, . . . RangeA24}, (b) Data Reads/s: (1) ReadsAvg=Avg(All Data Reads/s), (2) For each Data Reads/s, δDataReads=Data Reads/s−ReadsAvg, and/or (3) Divide (Min(δDataReads),Max(δDataReads) into 24 ranges: {RangeB1, RangeB2, . . . RangeB24}, (c) Same to Data Writes/s: {RangeC1, RangeC2, . . . RangeC24}, (d) Completed Activities/s: Completed activities per seconds, indicates the database's busy degree: (1) {RangeD1, RangeD2, . . . RangeD24}, and (e) Evaluation result for execution time of top SQL after statistics update.

In observing results of operation S520, the system collects performance metrics when and after updating of statistics, also collects metrics when it decides Not to proceed a statistics collection request: (a) When system decides to collect statistics: (1) when statistics was updated, whether the average execution time of SQLs decreased, and (2) whether major TPS drop during statistics update; and (b) when system decides not to collect statistics, whether a major TPS drop is observed after the system delayed a statistics request.

The following two (2) paragraphs will discuss operations S522 and 526, where a suggestion as ML (machine learning) input is returned in order to improve statistics update strategy using a Classification and Regression Tree (predictive algorithm).

Input classification involves: (a) SUI Range—Divide (0, max(SUI)) into R (that is, 24) ranges: {RangeA1, RangeA2, . . . RangeA24}; (b) Current statistics: (1) data amount, (2) specific IUD amount, and/or (3) execution frequency based on top SQL; and (c) evaluation result of the execution update statistics The output results include generation of a statistics update schedule for each tables based on the access activity and data change trends, it continuously optimized in actual operation. The following steps are performed: (a) when system decided to collect statistics (when statistics was updated, whether the average Execution time of SQLs decreased ?), and (b) when the system decides not to collect statistics (depending upon whether a major TPS drop is observed after system delayed a statistics request).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

Virtualized computing environments (VCEs): VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Cloud computing system: a computer system that is distributed over the geographical range of a communication network(s), where the computing work and/or computing resources on the server side are primarily (or entirely) implemented by VCEs (see definition of VCEs in previous paragraph). Cloud computing systems typically include a cloud orchestration module, layer and/or program that manages and controls the VCEs on the server side with respect to instantiations, configurations, movements between physical host devices, terminations of previously active VCEs and the like.

What is claimed is:

1. A computer-implemented method of facilitating processing within a computing environment, the computer-implemented method comprising:
configuring a relational database management system of a database system of the computing environment with metadata update code to automatically generate an updated metadata control set for a query optimizer of the relational database management system, wherein the database system includes a primary relational database and a secondary relational database, the secondary relational database being maintained in synchronization with the primary relational database over time as data of the primary relational database changes; and
wherein executing the metadata update code:
automatically generates the updated metadata control set from the secondary relational database;
executes query operations on the secondary relational database, with the query optimizer using the updated metadata control set, to confirm the updated metadata control set enhances performance of the query operations on the secondary relational database compared with a current metadata control set used in optimizing queries on the primary relational database; and
based on confirming that the updated metadata control set enhances performance of the query operations on the secondary relational database, initiates executing query operations on the primary relational database with query optimization using the updated metadata control set.

2. The computer-implemented method of claim 1, wherein the automatically generating the updated metadata control set from the secondary relational database is based on an amount of data changes experienced by the secondary relational database.

3. The computer-implemented method of claim 1, wherein the automatically generating the updated metadata control set from the secondary relational database is based on an amount of data changes experienced by the primary relational database.

4. The computer-implemented method of claim 1, wherein the updated metadata control set comprises at least one of: (i) table cardinality of the secondary relational database; (ii) number of pages in a database table of the secondary relational database; (iii) column cardinality of at least one table included in the secondary relational database; (iv) number of leaf pages in an index of the secondary relational database; (v) number of index levels in an index of the secondary relational database; or (vi) number of distinct key values in an index of the secondary relational database.

5. The computer-implemented method of claim 1, wherein the updated metadata control set comprises: (i) table cardinality of the secondary relational database; (ii) number of pages in a database table of the secondary relational database; (iii) cardinality of at least one table included in the secondary relational database; (iv) number of leaf pages in an index of the secondary relational database; (v) number of index levels in an index of the secondary relational database; and (vi) number of distinct key values in an index of the secondary relational database.

6. The computer-implemented method of claim 1 further comprising configuring the relational database management system with a disaster recovery system to ensure a disaster involving the primary relational database does not result in data loss due to maintenance of data at the secondary relational database.

7. The computer-implemented method of claim 1, wherein executing query operations on the secondary relational database, with the query optimizer using the updated metadata control set, to confirm the updated metadata control set enhances performance of the query operations on the secondary relation database compared with a current metadata control set used in optimizing queries on the primary relational database comprises evaluating at least one of: (i) elapse time of the execution; (ii) total processor usage; (iii) ratio of total number of rows read to the total number of rows returned;
or (iv) memory required for the execution.

8. A computer program product for facilitating processing within a computing environment, the computer program product comprising:
a set of one or more non-transitory computer readable storage media; and
program instructions, collectively stored in the set of one or more non-transitory computer readable storage media, for causing at least one processor set to perform computer operations comprising:
configuring a relational database management system of a database system of the computing environment with metadata update code to automatically generate an updated metadata control set for a query optimizer of the relational database management system, wherein the database system includes a primary relational database and a secondary relational database, the secondary relational database being maintained in synchronization with the primary relational database over time as data of the primary relational database changes; and
wherein executing the metadata update code:
automatically generates the updated metadata control set from the secondary relational database;
executes query operations on the secondary relational database, with the query optimizer using the updated metadata control set, to confirm the updated metadata control set enhances performance of the query operations on the secondary relational database compared with a current metadata control set used in optimizing queries on the primary relational database; and
based on confirming that the updated metadata control set enhances performance of the query operations on the secondary relational database, initiates executing query operations on the primary relational database with query optimization using the updated metadata control set.

9. The computer program product of claim 8, wherein the automatically generating the updated metadata control set from the secondary relational database is based on an amount of data changes experienced by the secondary relational database.

10. The computer program product of claim 8, wherein the automatically generating the updated metadata control set from the secondary relational database is based on an amount of data changes experienced by the primary relational database.

11. The computer program product of claim 8, wherein the updated metadata control set comprises at least one of: (i) table cardinality of the secondary relational database; (ii) number of pages in a database table of the secondary relational database; (iii) column cardinality of at least one table included in the secondary relational database; (iv) number of leaf pages in an index of the secondary relational database; (v) number of index levels in an index of the secondary relational database; or (vi) number of distinct key values in an index of the secondary relational database.

12. The computer program product of claim 8, wherein the updated metadata control set comprises: (i) table cardinality of the secondary relational database; (ii) number of pages in a database table of the secondary relational database; (iii) cardinality of at least one table included in the secondary relational database; (iv) number of leaf pages in an index of the secondary relational database; (v) number of index levels in an index of the secondary relational database; and (vi) number of distinct key values in an index of the secondary relational database.

13. The computer program product of claim 8 further comprising configuring the relational database management system with a disaster recovery system to ensure a disaster involving the primary relational database does not result in data loss due to maintenance of data at the secondary relational database.

14. The computer program product of claim 8, wherein executing query operations on the secondary relational database, with the query optimizer using the updated metadata control set, to confirm the updated metadata control set enhances performance of the query operations on the secondary relation database compared with a current metadata control set used in optimizing queries on the primary relational database comprises evaluating at least one of: (i) elapse time of the execution; (ii) total processor usage; (iii) ratio of total number of rows read to the total number of rows returned; or (iv) memory required for the execution.

15. A computer system for facilitating processing within a computing environment, the computer system comprising:
   at least one processor set;
   a set of one or more computer readable storage media;
   program instructions, collectively stored in the one or more computer readable storage media, for causing the at least one processor set to perform computer operations comprising:
      configuring a relational database management system of a database system of the computing environment with metadata update code to automatically generate an updated metadata control set for a query optimizer of the relational database management system, wherein the database system includes a primary relational database and a secondary relational database, the secondary relational database being maintained in synchronization with the primary relational database over time as data of the primary relational database changes; and
   wherein executing the metadata update code:
      automatically generates the updated metadata control set from the secondary relational database;
      executes query operations on the secondary relational database, with the query optimizer using the updated metadata control set, to confirm the updated metadata control set enhances performance of the query operations on the secondary relational database compared with a current metadata control set used in optimizing queries on the primary relational database; and
      based on confirming that the updated metadata control set enhances performance of the query operations on the secondary relational database, initiates executing query operations on the primary relational database with query optimization using the updated metadata control set.

16. The computer system of claim 15, wherein the automatically generating the updated metadata control set from the secondary relational database is based on an amount of data changes experienced by the secondary relational database.

17. The computer system of claim 15, wherein the automatically generating the updated metadata control set from the secondary relational database is based on an amount of data changes experienced by the primary relational database.

18. The computer system of claim 15, wherein the updated metadata control set comprises at least one of: (i) table cardinality of the secondary relational database; (ii) number of pages in a database table of the secondary relational database; (iii) column cardinality of at least one table included in the secondary relational database; (iv) number of leaf pages in an index of the secondary relational database; (v) number of index levels in an index of the secondary relational database; or (vi) number of distinct key values in an index of the secondary relational database.

19. The computer system of claim 15, wherein the updated metadata control set comprises: (i) table cardinality of the secondary relational database; (ii) number of pages in a database table of the secondary relational database; (iii) cardinality of at least one table included in the secondary relational database; (iv) number of leaf pages in an index of the secondary relational database; (v) number of index levels in an index of the secondary relational database; and (vi) number of distinct key values in an index of the secondary relational database.

20. The computer system of claim 15 further comprising configuring the relational database management system with a disaster recovery system to ensure a disaster involving the primary relational database does not result in data loss due to maintenance of data at the secondary relational database.

* * * * *